United States Patent Office 3,826,751
Patented July 30, 1974

3,826,751
SELECTIVE OPTICAL FILTER AND
METHOD OF MANUFACTURE
Norman U. Laliberte, Woodstock, Conn., assignor to American Optical Corporation, Southbridge, Mass.
Continuation of abandoned application Ser. No. 95,434, Dec. 7, 1970. This application Aug. 15, 1972, Ser. No. 280,936
The portion of the term of the patent subsequent to Dec. 21, 1988, has been disclaimed
Int. Cl. F21v 9/04; G02b 5/12; G02c 7/10
U.S. Cl. 252—300                                    7 Claims

ABSTRACT OF THE DISCLOSURE

An improved high optical quality, plastic optical filter for red and near infrared wavelengths has very low transmittance in the red portion of the visible spectrum, a reduced near infrared transmittance, and a high abrasion resistance. The optical filter is formed by dissolving a sufficient quantity of cupric or cuprous chloride in a mixture of monopropylene glycol monomaleate, and allyl diglycol carbonate, mixing the solution with diisopropyl peroxydicarbonate initiator, filtering the resultant mixture, and casting the filtered mixture.

CROSS-REFERENCE TO RELATED APPLICATIONS

This is a continuation of application Ser. No. 95,434, filed Dec. 7, 1970, now abandoned.

BACKGROUND OF THE INVENTION

This invention relates to optical filters and is more particularly concerned with improved materials and method of manufacture for such optical filters which selectively absorb radiation in the red and near infrared portions of the spectrum as is suitable for sunglass lenses.

Optical filters have been formed of plastic materials as well as vitreous materials. In many instances, the plastic optical filter material is the material of choice, particularly where the plastic material has a high optical quality, is generally unbreakable, is approximately one-half the weight of glass, and has a high resistance to abrasion. Thus, optical filters made of such plastic material are ideally suited for utilization as sunglass lenses and the like. It is particularly important in sunglass lenses that the optical filter material display significant absorbing properties for the visible red and near infrared portions of the spectrum to protect the wearer's eyes so that particularly the red radiation is reduced to safe and easily tolerable intensity levels. On the other hand, it is equally important that the sunglass lenses be adapated for high transmittance throughout the remaining portions of the visible spectrum. This requirement is based on the fact that the standard dyes used for sunglass lenses absorb very well for the shorter wavelengths, but do very little to attenuate the transmittance of red and near infrared radiation. While a number of sunglass lens materials have been proposed in the prior art, they simply have not provided the desired high visual transmittance along with the desired high red and near infrared absorption.

SUMMARY OF THE INVENTION

It is an object of the invention, therefore, to provide an improved plastic selective optical filter material and a method of manufacturing the selective optical filter.

It is also an object of the invention to provide an improved plastic selective optical filter which has very low transmittance of red wavelength radiation and a reduced near infrared transmittance.

It is a further object of the invention to provide such selectively absorbing filter materials, which when formed into plastic sunglass lenses maintain a high optical quality of the lens and high visual transmittance throughout the remainder of the spectrum.

It is an additional object of the invention to provide novel and improved method of manufacturing such selective optical filters.

Briefly, the invention in its broadest aspect comprises a high optical quality, selectively absorbing plastic optical filter and method of manufacture. The filter is the polymerized reaction product of from 40 through 92 weight percent of a monomer polymerized in the presence of from 2 to 54 weight percent of monopropylene glycol monomaleate having initially dissolved therein from 0.01 to 2.0 weight percent of an inorganic copper salt and from 2 to 7 weight percent of a free radical initiator. The filter is characterized by having very low transmittance of visible red light within the wavelength range between 625 and 875 nm. and a substantially reduced near infrared transmittance between 625 nm. and 1200 nm. The monomer is selected from the group consisting essentially of allyl diglycol carbonate, methyl methacrylate, vinyl acetate, triallyl cyanurate, ethylene glycol dimethacrylate, diallyl maleate, maleic anhydride, and combinations thereof. The inorganic copper salt is selected from the group consisting essentially of cuprous chloride, cupric chloride, cuprous iodide, cupric, fluoride, cuprous fluoride, cupric bromide, cuprous bromide, cupric nitrate, cuprous nitrate, cupric chromate, and combinations thereof.

These and other objects, advantages, and features of the invention may be found in the following description taken in conjunction with the accompanying drawing.

DETAILED DESCRIPTION OF THE PREFERRED EMBODIMENTS

Figure 1:
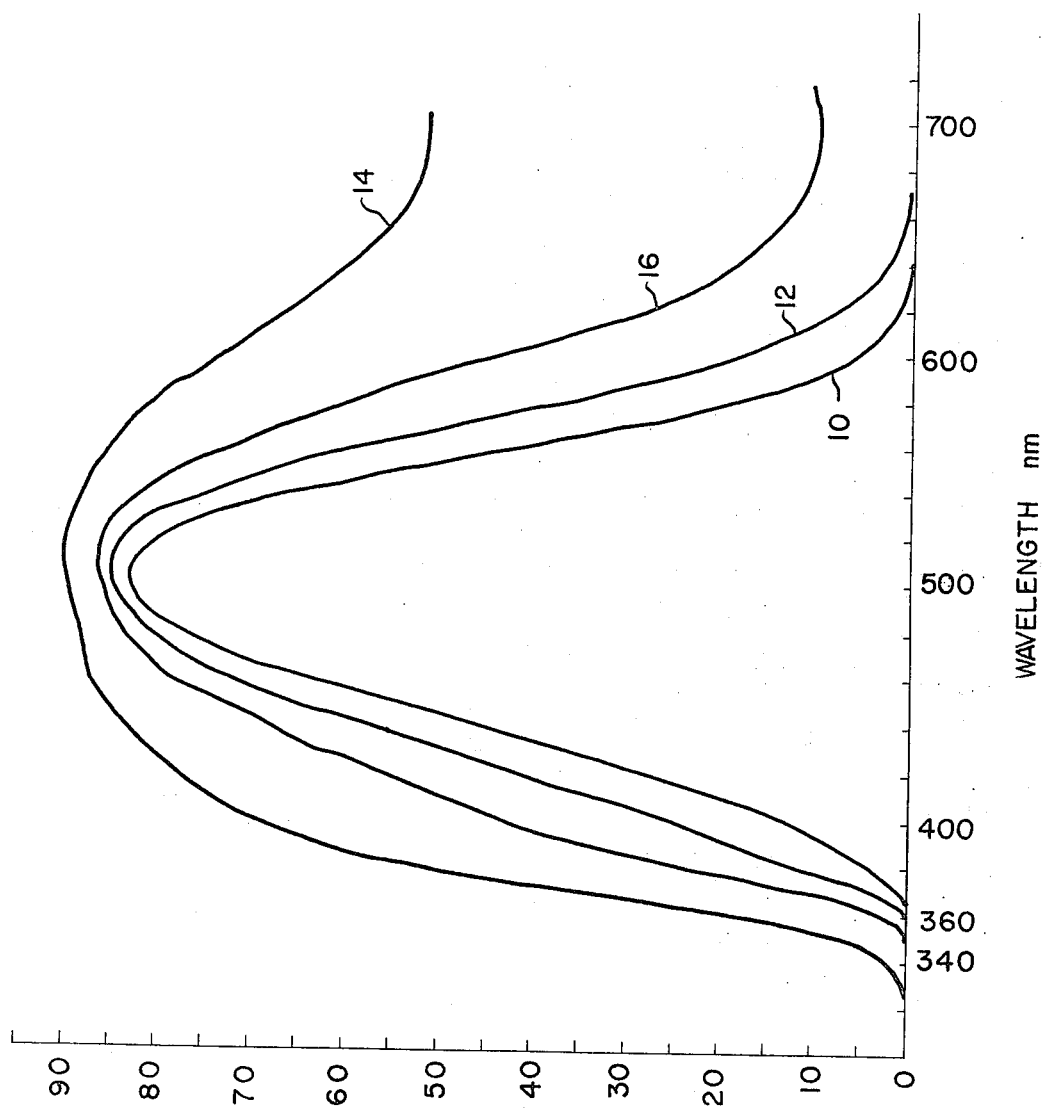
FIGS. 1 and 2 are plots of transmittance/absorbance versus wavelength for various specific compositions according to the invention.

According to the one form of the present invention, a lens or selective optical filter is produced from allyl diglycol carbonate polymerized with monopropylene glycol monomaleate having either cupric or cuprous chloride dissolved therein.

The selective optical filter, in a thickness of approximately two millimeters, has a transmittance in the wavelength range between 625 nm. and 875 nm. which ranges from zero up to any desired value while reducing the near infrared transmittance out to approximately 1200 nm. At the same time, visual transmittance remains generally above 50 percent.

The allyl diglycol carbonate is commonly called CR39 and produces high optical quality polymers. The resultant filter is stable, uniform, very abrasion resistant, and of high optical quality throughout the visible light range where the optical filter has a high transmittance.

An effective plastic selective optical filter, according to the invention, is produced by combining allyl diglycol carbonate with monopropylene glycol monomaleate having dissolved therein either cuprous or cupric chloride in the presence of a suitable catalyst or initiator such as diisopropyl peroxydicarbonate, commonly called isopropyl percarbonate, in the following proportions:

EXAMPLE A

|  | Weight | |
| --- | --- | --- |
|  | Gms. | Percent |
| Allyl diglycol carbonate (CR39) | 240 | 65.63 |
| Monopropylene glycol monomaleate (MPGM) | 100 | 27.34 |
| Diisopropyl peroxydicarbonate (IPP) | 21.7 | 5.93 |
| Cuprous chloride (CuCl) | 4.0 | 1.10 |

In forming an optical filter from the constituents of Example A, the monopropylene glycol monomaleate and the allyl diglycol carbonate are combined preliminarily with the cuprous chloride and are mixed thoroughly therewith until the cuprous chloride is dissolved. The catalyst, isopropyl percarbonate, and the mixture are combined in any conventional manner at about room temperature. After the ingredients have been mixed thoroughly, the resultant mixture is put through a cloth or paper filter to remove contaminants and undissolved ingredients from the mixture.

The filtered mixture is introduced into a conventional three-part mold. This mold is comprised of a pair of mold halves each having a respective casting surface thereon which are placed in a facing relationship with an annular spacer therebetween to form a mold cavity for such articles as lenses, or the like. The mold halves may be of any desired shape, for example, oval, generally rectangular, round, or the like, and are preferably formed of a rigid durable material such as metal or glass, and have highly polished casting surfaces. The spacer member forms a seal between the two halves when the halves are clamped together in a conventional manner. The liquid filtered mixture is injected into the mold cavity in a quantity sufficient to fill the cavity completely. In filling the cavity, care should be exercised so that no entrapped air remains in the cavity; usually an air vent is provided for release of entrapped air. Further, the mixture may be de-gassed prior to inserting it into the mold to prevent the inclusion of bubbles in the formed optical filter. The mold halves with the included liquid monomer are then clamped together by conventional clamps.

The liquid mixture is polymerized or cured by placing the mold in an oven or other suitable receptacle which may be heated for the requisite time and to the requisite temperature for polymerization of the mixture. Preferably, the temperature of the oven or receptacle is controllable so that a desired curing cycle may be used for the optical filter. As found in conventional practices, the quantity and configuration of the mixture in the mold affects the curing temperature and the curing time. Such times and temperatures may be resolved by conventional means. The curing cycle for Example A above, preferably has the temperature raised from room temperature to approximately 76° C. over a period of approximately fifteen hours. The resultant polymerized optical filter is of high optical quality. After removal from the mold, the filter may be cut to size, polished and/or finished as desired according to conventional practices.

As is found from an absorption test, an optical filter or lens, formed from the ingredients set forth in Example A, shows desirable transmitting and absorbing characteristics and is ideally suited for a sunglass lens. These results are shown by the plot 10 of FIG. 1. This test, as well as all others to be described hereinbelow, was performed on samples two millimeters in thickness. This filter has substantially zero transmittance of radiation in the wavelength range between about 625 nm. and 875 nm. and a substantial reduction, to about 29 percent, of the infrared transmittance in the wavelength range between 800 nm. and 1200 nm. The infrared light of wavelengths longer than about 1000 nm. forms a relatively small portion of total solar radiation and these wavelengths have relatively little harmful effect upon the human eye. Furthermore, the basic plastic material absorbs most energy having a wavelength greater than about 2200 nm. The transmittance of the visible light peaks at about 86% in the region of 500 nm. and averages 45 to 55 percent.

A lens formed by the process described above is characterized by a hardness and a resistance to abrasion corresponding favorably to those of lenses formed from allyl diglycol carbonate alone. Furthermore, the lens is characterized by the presence of high optical clarity and absence of haze. The optical surfaces may be worked conventionally to produce prescription ophthalmic lenses without affecting the selective optical filtering properties thereof.

In Table II below, there are given several additional examples of optical filters made with various proportions of allyl diglycol carbonate and monopropylene glycol monomaleate with either cupric or cuprous chloride.

TABLE II

|  | Ex. B | Ex. C | Ex. D | Ex. E | Ex. F |
|---|---|---|---|---|---|
| CR39 | 65.63 | 88.33 | 88.33 | 87.09 | 87.09 |
| MPGM | 27.34 | 5.30 | 5.30 | 6.98 | 6.98 |
| IPP | 5.93 | 6.18 | 6.18 | 5.66 | 5.66 |
| CuCl$_2$ | 1.10 | 0.19 |  | 0.27 |  |
| CuCl |  |  | 0.19 |  | 0.27 |

Curve 12 of FIG. 1 provides the absorbance/transmittance spectrum for a filter according to Example B.

It is not always desirable to have complete absorption of light in the 625 nm. to 875 nm. wavelength range; therefore, various lesser amounts of the inorganic salts may be utilized in forming filters or lenses according to the present invention. Examples of such materials are given in Examples C, D, E, and F. The absorbance/transmittance plots for these materials are given by curves 14 and 16 of FIG. 1, curve 14 being for Examples C and D and curve 16 being for Examples E and F.

The materials of Examples E and F are excellent candidates for utilization as lenses for sunglasses. The transmittance at 700 nm. is approximately 10% while the visual transmittance is approximately 65%. If this material is chosen for a sunglass lens, it is first formed to the desired configuration. Subsequently, external dyeing methods, which are known in the art, lower the transmittance of the lens throughout the shorter wavelength portion of the visual spectrum. Therefore, a plastic sunglass lens may be provided which absorbs uniformly across the visible spectrum, which lowers the infrared transmittance. The uniform transmittance allows the lens to protect the wearer's eye and yet provides a true rendering of color throughout the visible spectrum.

When filters are formed as described above, exposure to strong ultra-violet light causes a lessening of the absorption properties of both the dissolved inorganic copper salt and any dyes which may have been externally applied to the filter. Therefore, it has been found to be advantageous to include an ultra-violet absorbing agent within the material to protect the other absorbing agents as well as to additionally protect the eyes of the wearer. Examples of ultra-violet absorbers which have been found to be useful are methyl silicilate, 2-hydroxy-4n octoxybenzophenone, and the presently preferred agent, 2,2'-Dihydroxy - 4 - methoxybenzophenone which is commercially available from American Cyanamid Company as Cyasorb UV 24. Example G gives the composition, in weight percent, of a filter incorporating this agent.

EXAMPLE G

| | |
|---|---|
| CR39 | 76.13 |
| MPGM | 17.30 |
| CuCl$_2$ | 0.34 |
| UV 24 | 0.17 |
| IPP | 6.06 |

Figure 2:
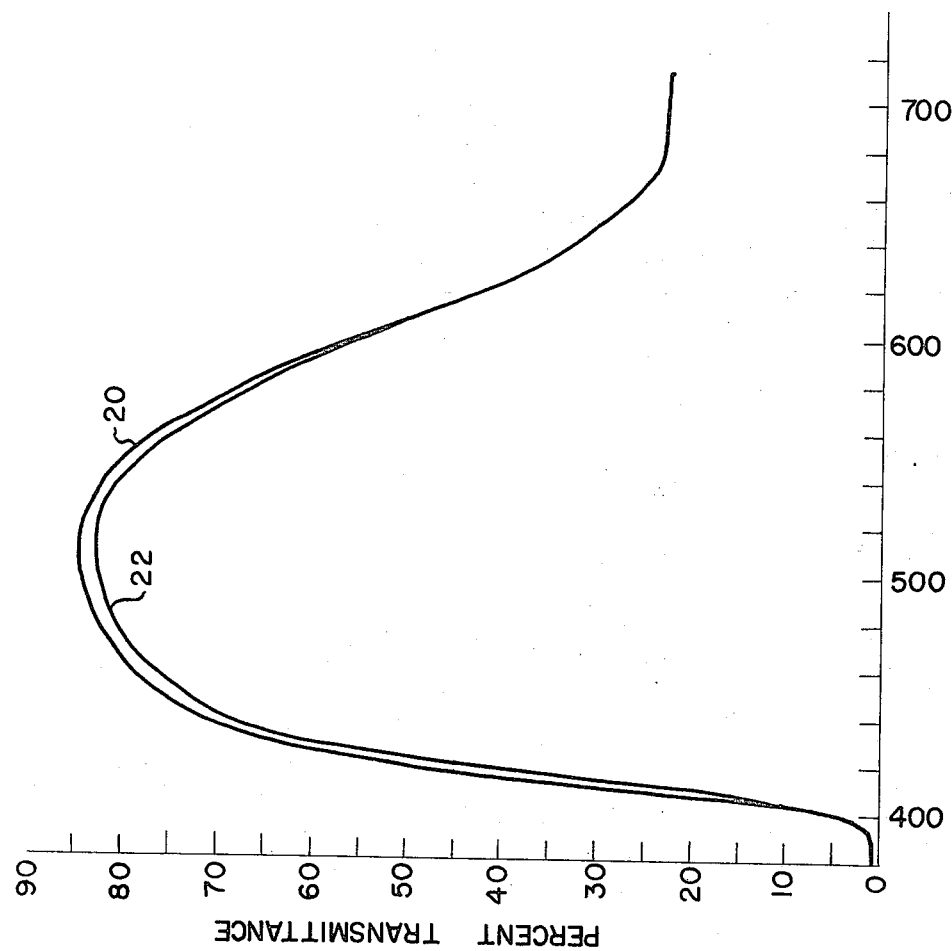

FIG. 2 shows the protection which the UV 24 affords the other absorbing agents in the filter. Curve 20 shows the transmittance/absorbance of a newly produced filter. Curve 22 shows the performance of the same filter after exposure to 40 hours of very intense ultra-violet light. The deterioration of the filter is only very slight through the visible spectrum and is almost negligible at the longer wavelengths.

Additional inorganic copper salts have been used for providing the required filtering action. These include cuprous iodide, cupric fluoride, cuprous fluoride, cupric bromide, cuprous bromide, cupric nitrate, cuprous nitrate, and cupric chromate. Examples of such filter compositions are given below in weight percent.

| | Ex. H | Ex. I | Ex. J | Ex. K | Ex. L | Ex. M | Ex. N | Ex. O |
|---|---|---|---|---|---|---|---|---|
| CR39 | 62.09 | 62.09 | 62.09 | 62.09 | 62.09 | 62.09 | 62.09 | 62.09 |
| MPGM | 31.05 | 31.05 | 31.05 | 31.05 | 31.05 | 31.05 | 31.05 | 31.05 |
| UV 24 | 0.62 | 0.62 | 0.62 | 0.62 | 0.62 | 0.62 | 0.62 | 0.62 |
| IPP | 6.21 | 6.21 | 6.21 | 6.21 | 6.21 | 6.21 | 6.21 | 6.23 |
| CuI | 0.03 | | | | | | | |
| CuF$_2$ | | 0.03 | | | | | | |
| CuF | | | 0.03 | | | | | |
| CuBr | | | | 0.03 | | | | |
| CuBr$_2$ | | | | | 0.03 | | | |
| Cu(NO$_3$)$_2$ | | | | | | 0.03 | | |
| CuNO$_3$ | | | | | | | 0.03 | |
| CuCrO$_4$ | | | | | | | | 0.02 |

The aforementioned additional inorganic copper salts were not so effective as the copper chloride only because lesser amounts were utilized and provided a transmittance ranging from 3 to 14 percent at 700 nm.

The quantity of allyl diglycol carbonate, useful for forming optical filters according to the invention, ranges from about 40–92 weight percent, the amount of monopropylene glycol monomaleate ranges from about 2–54 weight percent, the amount of isopropyl percarbonate ranges from 2 to 7 weight percent, and the amount of the copper salt ranges from 0.01 to 2.0 weight percent.

Various combinations of other monomers may be used alone or along with allyl diglycol carbonate; and the monomers useful for this purpose include methyl methacrylate, vinyl acetate, triallyl cyanurate, ethylene glycol dimethacrylate, diallyl maleate, and maleic anhydride. The following examples illustrate the compositions by weight percent of optical filters which include methyl methacrylate or vinyl acetate.

| | Ex. P | Ex. Q |
|---|---|---|
| CR39 | 72.88 | 72.88 |
| MPGM | 7.29 | 7.29 |
| MMA | 14.57 | |
| CuCl or CuCl$_2$ | 0.16 | 0.16 |
| IPP | 5.10 | 5.10 |
| VA | | 14.57 |

Furthermore, the aforementioned monomers may be mixed in varying proportions to produce suitable selective optical filter materials. Examples of such compositions are given below in weight percent.

| | Ex. R | Ex. S |
|---|---|---|
| CR39 | 72.88 | 72.88 |
| MMA | 7.29 | 3.59 |
| TAC | 7.29 | 7.29 |
| MPGM | 7.29 | 7.29 |
| DAM | | 3.59 |
| CuCl or CuCl$_2$ | .16 | .16 |
| IPP | 5.10 | 5.10 |

The particular copper salts chosen may be mixed to provide a filter material having the desired absorption characteristics, such as given in the following example in weight percent.

EXAMPLE T

| | |
|---|---|
| CR39 | 65.63 |
| MPGM | 27.34 |
| IPP | 5.93 |
| CuCl | 0.55 |
| CuCl$_2$ | 0.55 |

The initiator may also be varied. Other free radical initiators such as benzoyl peroxide or any other members of the peroxycarbonate class of initiators such as isobutyl percarbonate may be substituted for the isopropyl percarbonate although the temperature of the curing cycle should be raised about 30° F. when using benzoyl peroxide. These initiators may be used both alone and in combination with successful results as shown by the following Examples.

| | Ex. U | Ex. V | Ex. W |
|---|---|---|---|
| CR39 | 88.14 | 88.14 | 88.14 |
| MPGM | 8.81 | 8.81 | 8.81 |
| IPP | | | 1.43 |
| CuCl | 0.18 | 0.18 | 0.18 |
| IBP | 2.87 | | 1.44 |
| BP | | 2.87 | |

The amount of initiator may be widely varied within the prescribed limits. However, care needs to be taken when varying the initiator content to conform the curing cycle to the ingredients. The following examples show suitable compositions for selective optical filters according to the invention in which an increased amount of initiator is utilized. The curing cycle for these compositions is similar to the one detailed hereinabove.

| | Ex. X | Ex. Y |
|---|---|---|
| CR39 | 61.18 | 88.14 |
| MPGM | 6.12 | 8.81 |
| MMA | 30.59 | |
| CuCl$_2$ or CuCl | 0.15 | 0.18 |
| IPP | 1.96 | 2.87 |

While there have been shown and described what are considered to be preferred embodiments of the present invention, it will be obvious to those skilled in the art that various changes and modifications may be made therein without departing from the invention.

I claim:

1. A high optical quality, selectively absorbing plastic sunglass lens comprising a polymerized reaction product of from 40 to 92 weight percent of a monomer polymerized in the presence of from 2 to 54 weight percent of monopropylene glycol monomaleate having initially dissolved therein from 0.01 to 2.0 weight percent of an inorganic copper salt and from 2 to 7 weight percent of a free radical initiator, the lens being characterized by having a visual transmittance of at least 50 percent, very low transmittance of visible red light within the wavelength range between 625 and 875 nm. and a substantially reduced near infrared transmittance between 625 nm. and 1200 nm., the monomer being selected from the group consisting essentially of allyl diglycol carbonate, methyl methacrylate, vinyl acetate, triallyl cyanurate, ethylene glycol dimethacrylate, diallyl maleate, maleic anhydride, and combinations thereof, the inorganic copper salt being selected from the group consisting essentially of cuprous chloride, cupric chloride, cuprous iodide, cupric fluoride, cuprous fluoride, cupric bromide, cuprous bromide, cupric nitrate, cuprous nitrate, cupric chromate, and combinations thereof.

2. A high optical quality selectively absorbing plastic optical filter according to Claim 1, wherein allyl diglycol carbonate is reacted with monopropylene glycol monomaleate having dissolved therein an inorganic copper salt selected from the group consisting essentially of cuprous chloride and cupric chloride.

3. A high optical quality selectively absorbing plastic optical filter according to Claim 2, wherein the initiator is chosen from the group consisting of benzoyl peroxide and peroxycarbonate initiators.

4. A high optical quality selectively absorbing plastic optical filter according to Claim 3, wherein the polymerization is catalyzed by an initiator chosen from the group consisting of isobutyl percarbonate and isopropyl percarbonate.

5. A high optical quality selectively absorbing plastic optical filter according to Claim 4, wherein the filter consists essentially of the following constituents by weight percent:

| | |
|---|---|
| Allyl diglycol carbonate | 87.09 |
| Monopropylene glycol monomaleate | 6.98 |
| Isopropyl percarbonate | 5.66 |
| Inorganic copper salt | 0.27 | wherein the inorganic salt is chosen from the group consisting essentially of cuprous chloride and cupric chloride.

6. A high optical quality selectively absorbing plastic optical filter according to Claim 1, wherein a minor amount of an ultra-violet radiation absorbing agent is included in the polymerized product, the ultra-violet absorbing agent being selected from the group consisting of methyl silicilate, 2-hydroxy-4n octoxybenzophenone, and 2,2′-dihydroxy-4-methoxybenzophenone.

7. A method for producing a high optical quality selectively absorbing plastic sunglass lens comprising the steps of:

dissolving from 0.01 to 2.0 weight percent of an inorganic copper salt selected from the group consisting of cuprous chloride, cupric chloride, cuprous iodide, cupric fluoride, cuprous fluoride, cupric bromide, cuprous bromide, cupric nitrate, cuprous nitrate, cupric chromate, and combinations thereof, in from 2 to 54 weight percent of monopropylene glycol monomaleate;

mixing the solution with from 40 to 92 weight percent of a monomer and a sufficient quantity of a free radical catalyst to polymerize the mixture, the monomer being selected from the group consisting essentially of allyl diglycol carbonate, methyl methacrylate, vinyl acetate, triallyl cyanurate, ethylene glycol dimethacrylate, diallyl maleate, maleic anhydride, and combinations thereof;

filtering the mixture;

pouring the filtered mixture into a lens mold;

heating the filtered mixture in the lens mold to cure the same into an abrasion resistant, selectively absorbing high optical quality lens;

removing the cured lens from the mold; and dyeing the lens externally to provide a sunglass lens having uniform absorption of light throughout the visible portion of the electromagnetic spectrum.

References Cited

UNITED STATES PATENTS

| | | | |
|---|---|---|---|
| 2,993,789 | 7/1961 | Crawford | 260—45.75 |
| 3,104,176 | 9/1963 | Hovey | 252—300 |
| 3,188,363 | 6/1965 | Amidon et al. | 260—45.75 |
| 3,216,969 | 11/1965 | Cyba | 260—45.75 |
| 3,629,130 | 12/1971 | Hovey | 252—300 |

RONALD H. SMITH, Primary Examiner

J. P. BRAMMER, Assistant Examiner

U.S. Cl. X.R.

350—2, 175